United States Patent Office 3,317,519
Patented May 2, 1967

---

3,317,519
SIMULTANEOUS DEPOLYMERIZATION OF POLY-CAPROAMIDE AND POLYESTER WITH RECOVERY OF CAPROLACTAM
Stanley D. Lazarus, Ian C. Twilley, and Orvill E. Snider, Petersburg, Va., assignors to Allied Chemical Corporation, New York, N.Y., a corporation of New York
No Drawing. Filed May 21, 1965, Ser. No. 457,853
8 Claims. (Cl. 260—239.3)

This invention relates to the regeneration of monomers from polymeric compounds. More particularly it relates to the regeneration and recovery of caprolactam, polycarboxylic acids and alkylene glycols from blends of polycaproamide and polyesters, especially blends representing a dispersion of polyester in polyamide and vice versa.

It has recently been discovered that yarns having unusually improved properties especially with respect to tenacity, fatigue resistance and low strength loss on heating may be obtained by melt spinning polymer blends comprising dispersions of polyamides and polyesters. In especially preferred modifications, the yarns are produced from nylon-6 i.e. polycaproamide and polyesters which are derived from homocyclic aromatic dicarboxylic acids and alkylene glycols such as ethylene and propylene glycol. The preferred dicarboxylic acid is terephthalic acid although others such as isophthalic, 5-t-butyl isophthalic, 2,6-naphthalene-dicarboxylic and 2,7-naphthalene-dicarboxylic acid may be employed.

In the preparation of these blends, large quantities of material may be produced which are not suitable for commercial use. Often as much as from 5% to 15% of the total production may be in this category. Accordingly, it is a most important commercial consideration to regenerate and recover the monomeric constituents of the blend for reuse. The process, however, to be economically acceptable must return the monomers in high yield and purity without excessive loss through decomposition or side reactions. Known processes for the separation and recovery of caprolactam from polyamides such as nylon-6 or dicarboxylic acids and polyhydroxy alcohols from polyesters do not produce the desired monomers in high yields and purity when applied to the above described blends.

This invention provides a process whereby the monomeric constituents of polymeric mixtures of polycaproamides and polyesters can be regenerated and recovered in high yield and purity in a simple and efficient manner.

Broadly speaking the invention comprises heating the mixture with an aqueous alkali metal hydroxide at an elevated pressure, precipitating the thus formed homocyclic aromatic dicarboxylic acid by acidification with a strong acid, i.e. an acid having a higher dissociation constant than the dicarboxylic acid and recovering caprolactam and glycol from the filtrate. Because glycols, especially ethylene glycol, are relatively inexpensive compared with caprolactam and dicarboxylic acids, it is often practical to forego their recovery.

Both caprolactam and the glycol may be recovered by salting out a mixture of the two ingredients from the filtrate from the recovery of the dicarboxylic acid after adjusting the pH to from about 6 to about 8. The lactam and glycol can then be removed as a single phase mixture separate from the aqueous salt phase, and the two monomers can be separated by distillation. Any of the usual water soluble inorganic salts generally used industrially for salting out can be employed for this operation in accordance with this invention. The particular salt used is not critical. However, for convenience, it is preferred to use a salt having the same anion as the acid used for precipitation of the dicarboxylic acid.

Alternatively, the caprolactam and glycol may be recovered by distillation of the entire filtrate after adjustment of the pH without previous phase separation via salting out. If only the caprolactam is to be recovered, the filtrate can be simply washed with a water immiscible organic solvent which extracts caprolactam, and the caprolactam can then be recovered by distillation. The particular extraction solvent utilized is not critical. It will generally be chosen from the group consisting of aliphatic and aromatic hydrocarbon and halogenated hydrocarbon solvents containing up to seven carbon atoms, and will be selected on the basis of cost, volatility, flammability, toxicity and the partition coefficient of caprolactam between the solvents and water. Benzene, toluene, chloroform, carbon tetrachloride and trichloroethylene are examples of suitable solvents.

The process of this invention can be carried out either continuously or batchwise.

In the first step of the process, the polymer mixture is heated in an aqueous alkali metal hydroxide, suitably sodium or potassium hydroxide at from about 180° C. to about 320° C. and a pressure of about 150 to about 350 pounds per square inch gauge, suitably the autogenous pressure, until no more of the mixture will dissolve. Temperatures and pressures appreciably above or below these ranges can be employed although the results are ordinarily somewhat less satisfactory. The time of reaction may vary widely. In the foregoing temperature and pressure ranges a reaction period of from about one to ten hours generally affords best results. The ratio of water to polymer mixture initially employed will be at least about 1:1 and suitably up to about 9:1 by weight based on the dry weight of the mixture. The amount of base initially employed in batch operations will usually be from about 3% to 20% by weight based on the dry weight of the polymeric mixture in the initial reaction mixture. The larger proportions of alkali will be desirable when relatively large proportions of polyester are present in the polymer mixture, inasmuch as alkali will be consumed by acid produced from polyester. It will be appreciated that in batch reaction, as polymers are converted to monomers, the quantity of polymer in the mixture decreases. The quantity of alkali metal hydroxide also decreases progressively during batch depolymerization as the hydroxide reacts with liberated acid; and the quantity of water somewhat decreases as polyester is converted to monoacid salt and glycol. Since the depolymerization and the consumption of alkali proceed together, the proportion of alkali:polymer will remain more or less constant; however the alkali will become more dilute unless some water is allowed to escape from the reaction vessel. It is notable that in our process, notwithstanding that large amounts of water are present at elevated temperatures, the caprolactam monomer formed is substantially recoverable.

In continuous or semi-continuous operations, the polymers and/or alkali and/or water and/or products will be continuously or intermittently removed and replaced so that essentially the initial proportions can be maintained between the reaction mixture ingredients.

For commercial operations it is preferred to operate at a temperature of from 210° C. to 250° C. at a pressure of 200 to 300 pounds per square inch gauge during a period of from three to five hours in an aqueous base containing 3% to 10% alkali hydroxide at a water to polymer mixture ratio of from 2:1 to 3:1.

At the end of the reaction period the mixture is filtered to remove any undissolved residue. The filtrate is then acidified with a strong acid, suitably a mineral inorganic acid to liberate the desired dicarboxylic acid. The selected acid should have a higher dissociation constant than the dicarboxylic acid being liberated. Any of a number of acids can be employed including, for example, hydrochloric, phosphoric, or sulfuric, with the preferred acids being phosphoric and sulfuric acid because of corrosion problems. Of the presently available acids sulfuric acid is much preferred for reasons of efficiency and economy.

The liberated acid is recovered by filtration, when it is a solid. It may be washed with water or with the filtrate in order to purify the solid precipitated acid and to recover any of the other desirable products which may have coprecipitated with it.

Caprolactam and the glycol may be recovered from the filtrate by distillation after adjusting the pH to about 6 to 8, preferably 7. Alternatively, these products may be salted out of aqueous solution for example, by saturating the filtrate with an inorganic salt such as sodium chloride or sodium sulfate. If the latter salt is used the temperature of the solution must be kept high enough to keep the salt in solution and prevent the formation of hydrated forms of the salt which will precipitate. A temperature of from about 45° C. to about 55° C. is adequate.

As aforesaid, if only caprolactam is to be recovered from the filtrate, this may be accomplished by washing the filtrate with a suitable extraction solvent and distilling the extract.

As stated above, the process of this invention is efficient, economical and provides the products high yields and purity. There is very little loss of monomer by decomposition. This may well be due to the employment of relatively dilute aqueous solutions of base in the reaction mixture, compared with prior art procedures for the regeneration and recovery of monomers from like polymers wherein very concentrated reagents are employed.

The following examples are given by way of illustration only and are not to be considered limitations of this invention, many apparent variations of which are possible without departing from the spirit or scope thereof.

*Example 1*

Twenty-five grams of a yarn spun from a blend of 70:30 nylon-6 and polyethylene terephthalate is added to 50 grams of water containing 1.75 grams of sodium hydroxide and heated in an autoclave at 230° C. and 250 p.s.i.g. pressure for ten hours. The mixture is cooled, filtered and the pH adjusted to 2.5 with concentrated sulfuric acid. The terephthalic acid which precipitates is washed with water and dried. The yield is 6.3 grams (97.4% of theoretical). The filtrate is heated to 50° C., adjusted to pH 7.0 with aqueous sodium hydroxide and 16 grams of anhydrous sodium sulfate added whereupon a top layer containing caprolactam and ethylene glycol separates. The upper layer weighs 23 grams. It contains 14 grams of caprolactam (80% of theoretical) and 1.8 grams of ethylene glycol (75% of theoretical). Upon distillation of 20 grams of this layer the following results are obtained.

TABLE I.—COMPOSITION OF DISTILLATION FRACTIONS, AND RECOVERIES

| Fraction Weight in Grams | Boiling Range, Degree C. | Percent Lactam | Percent Glycol | Percent Recovery of Lactam in Yarn | Percent Recovery of Glycol in Yarn |
|---|---|---|---|---|---|
| 6.4 | 100–101 | 0 | 0 | 0 | 0 |
| 2.9 | 101–210 | 5 | 51 | 1 | 70 |
| 1.2 | 255–265 | 91 | 9 | 9 | 5 |
| 7.5 | 265–268 | 100 | 0 | 70 | 0 |

The fractions are redistilled to obtain pure caprolactam and ethylene glycol.

Similar results are obtained in separate examples in which the pH of the filtrate is adjusted to 6 and to 8.

These procedures are repeated with the following compositions to obtain similar results.

TABLE II

| Polyester | Polyamide | Weight Ratio of Polyester/Polyamide |
|---|---|---|
| Polyethylene terephthalate | Nylon-6 | 10/90 |
| Polyethylene 2,6 naphthalene dicarboxylate | do | 40/60 |
| Polyethylene 5-t-butyl isophthalate | do | 25/75 |
| Polyethylene 5-t-butyl isophthalate | do | 35/65 |
| Polyethylene isophthalate | do | 30/70 |
| Poly 1,4 cyclohexylene dimethylene terephthalate | do | 30/70 |
| Poly m-xylylene isophthalate | do | 30/70 |

With the second and third compositions of Table II acidification is effected with hydrochloric and phosphoric acid respectively and sodium chloride is used for salting out. Only sufficient acid is added to precipitate the dicarboxylic acid; it is not essential that the pH of the solution be adjusted to exactly 2.5, which is the pH of the pure acid of this concentration.

*Example 2*

The procedures of Example 1 are repeated except that the caprolactam is extracted with toluene from the layer containing it. The toluene extractant is removed by distillation and the residue of caprolactam is purified by steam distillation. The yields are similar to those obtained in Example 1.

*Example 3*

The procedure of Example 1 in which the pH of the filtrate is adjusted to 7.0 is repeated except that the filtrate is directly distilled without separating layers. The following table shows the results obtained with a 70:30 weight ratio blend of polyethylene terephthalate and nylon-6, ratio by weight.

TABLE III.—COMPOSITION OF DISTILLATION FRACTIONS, AND RECOVERIES

| Fractions | Boiling Range, Degree C. | Percent Lactam | Percent Glycol | Percent Recovery of Lactam in Yarn | Percent Recovery of Glycol in Yarn |
|---|---|---|---|---|---|
| 1 | 100–101 | 0 | 0 | 0 | 0 |
| 2 | 101–210 | 12 | 70 | 5 | 85 |
| 3 | 255–265 | 85 | 10 | 20 | 5 |
| 4 | 265–268 | 100 | 0 | 65 | 0 |

What is claimed is:

1. A process which comprises heating an aqueous composition comprising water and a polymer mixture of poly-e-caproamide and a polyester formed from alkylene glycol and aromatic homocyclic dicarboxylic acid, the composition containing water:polymer mixture in initial weight ratio of at least about 1:1 and containing from about 3% to about 20% by weight of alkali metal hydroxide based on the dry weight of said polymer mixture, in the initial reaction mixture; the heating being at a temperature of from about 180° C. to about 320° C. and a pressure of from about 150 to about 350 pounds per square inch, thereby regenerating alkylene glycol and dicarboxylic acid together with caprolactam.

2. A process which comprises heating an aqueous composition comprising water and a polymer mixture of poly-e-caproamide and a polyester formed from alkylene glycol and aromatic homocyclic dicarboxylic acid the composition containing water:polymer mixture in initial weight ratio of from about 1:1 to about 9:1 and containing from about 3% to about 15% by weight of alkali metal hydroxide based on the dry weight of said polymer mixture, in the initial reaction mixture; the heating being at a temperature of from about 180° C. to about 320° C. and a pressure of from about 150 to about 350 pounds per square inch to regenerate alkylene glycol and dicarboxylic acid together with caprolactam; acidifying resulting mixture with a strong acid to liberate the dicarboxylic acid and recovering the said acid from the mixture, adjusting the pH of the remaining mixture to a range from about 6 to about 8 and separating caprolactam therefrom.

3. A process which comprises heating an aqueous composition comprising water and a polymer mixture of poly-e-caproamide and polyalkylene terephthalate the composition containing water:polymer mixture in a weight ratio of from about 1:1 to about 9:1 and containing from about 3% to about 15% by weight of sodium hydroxide based on the dry weight of said polymer mixture at a temperature of from about 210° C. to about 250° C. and a pressure of from about 200 to about 300 pounds per square inch; acidifying resulting mixture with a strong acid to precipitate the terephthalic acid and recovering the said acid from the mixture, adjusting the pH of the remaining mixture to a range from about 6 to about 8 and separating caprolactam therefrom.

4. Process of claim 3 wherein the polyalkylene terephthalate is polyethylene terephthalate.

5. Process of claim 4 wherein the strong acid is sulfuric acid.

6. Process of claim 3 wherein the mixture having pH from about 6 to about 8 is extracted with a water immiscible organic solvent selected from the group consisting of aliphatic and aromatic hydrocarbon and halogenated hydrocarbon solvents containing up to 7 carbon atoms whereby caprolactam is extracted from said mixture.

7. Process of claim 6 wherein the organic solvent is toluene.

8. Process of claim 3 wherein the mixture having pH from about 6 to about 8 is saturated with a water soluble inorganic salt to salt out a layer containing caprolactam and alkylene glycol, which are separated.

No references cited.

WALTER A. MODANCE, *Primary Examiner.*

ROBERT BOND, *Assistant Examiner.*